US008286838B2

(12) United States Patent
Preteroti

(10) Patent No.: US 8,286,838 B2
(45) Date of Patent: Oct. 16, 2012

(54) LEAK PROOF FRAGRANCE BOTTLE

(75) Inventor: Dennis Preteroti, Hewitt, NJ (US)

(73) Assignee: LF Beauty, New York, NY (US)

( * ) Notice: Subject to any disclaimer, the term of this patent is extended or adjusted under 35 U.S.C. 154(b) by 459 days.

(21) Appl. No.: 11/731,194

(22) Filed: Mar. 30, 2007

(65) Prior Publication Data

US 2008/0237268 A1 Oct. 2, 2008

(51) Int. Cl.
*G01F 11/00* (2006.01)

(52) U.S. Cl. .................................... 222/321.9; 222/385

(58) Field of Classification Search ............... 222/321.9, 222/562, 321.1–321.8, 372, 402.1, 385; 220/796, 220/799; 215/317, 274
See application file for complete search history.

(56) References Cited

U.S. PATENT DOCUMENTS

| | | | | |
|---|---|---|---|---|
| 2,723,773 | A * | 11/1955 | Greene | 215/29 |
| 2,870,943 | A * | 1/1959 | Scoggin, Jr. | 222/321.9 |
| 5,052,568 | A * | 10/1991 | Simon | 215/317 |
| 5,348,174 | A * | 9/1994 | Velicka | 215/277 |
| 5,749,690 | A * | 5/1998 | Kutz | 411/431 |
| 5,799,810 | A * | 9/1998 | de Pous et al. | 215/274 |
| 5,950,880 | A * | 9/1999 | Garcia | 222/321.7 |
| 6,015,061 | A * | 1/2000 | Lowry | 220/796 |
| 6,253,941 | B1 * | 7/2001 | VanBrocklin et al. | 215/274 |
| 6,439,440 | B1 * | 8/2002 | Lasserre | 222/402.21 |
| 6,527,148 | B2 * | 3/2003 | de Rosa | 222/321.7 |
| 6,571,991 | B2 * | 6/2003 | Jourdin | 222/321.9 |
| 6,708,852 | B2 * | 3/2004 | Blake | 222/321.9 |
| 6,776,311 | B2 * | 8/2004 | Ackermann | 222/321.7 |
| 7,451,899 | B2 * | 11/2008 | de Pous | 222/321.9 |
| 2002/0145005 | A1 * | 10/2002 | Sanchez | 222/321.1 |
| 2008/0023498 | A1 * | 1/2008 | Bertin et al. | 222/321.9 |

* cited by examiner

*Primary Examiner* — Kevin P Shaver
*Assistant Examiner* — Daniel R Shearer
(74) *Attorney, Agent, or Firm* — Horst M. Kasper

(57) ABSTRACT

The present invention is directed toward a device identified as a slip ring collar retainer for fragrance bottles which prevents undesired leakage of fragrance.

17 Claims, 5 Drawing Sheets

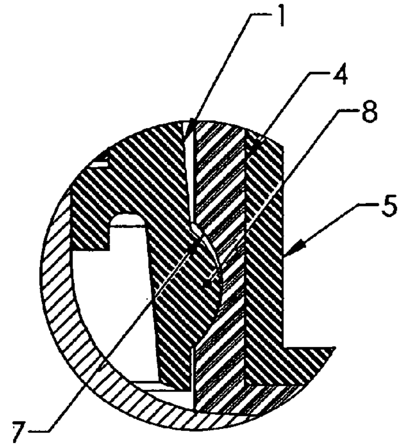
Fig 1-B
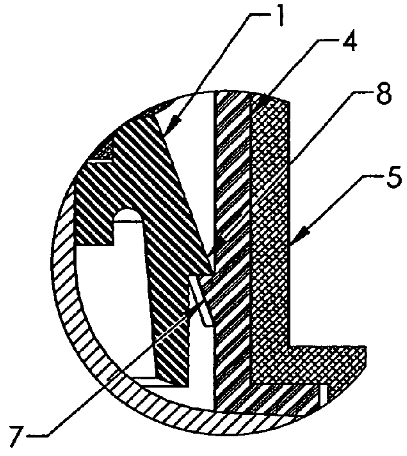
Fig 2-B
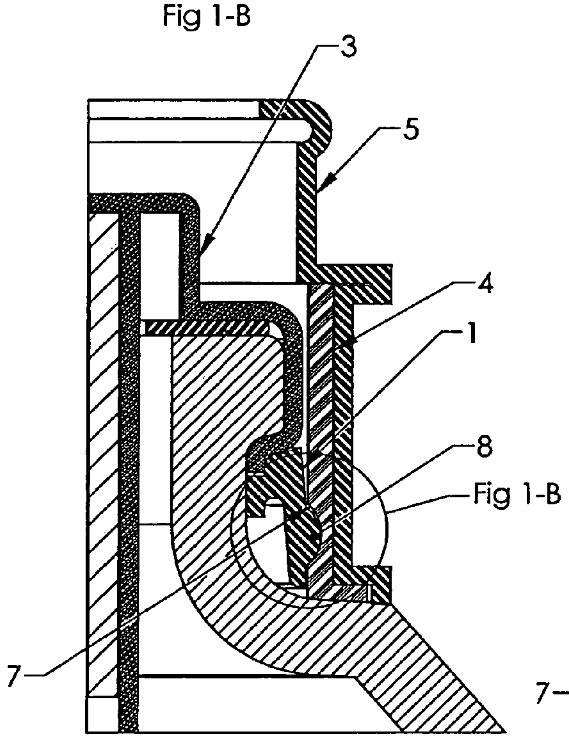
Fig 1-A
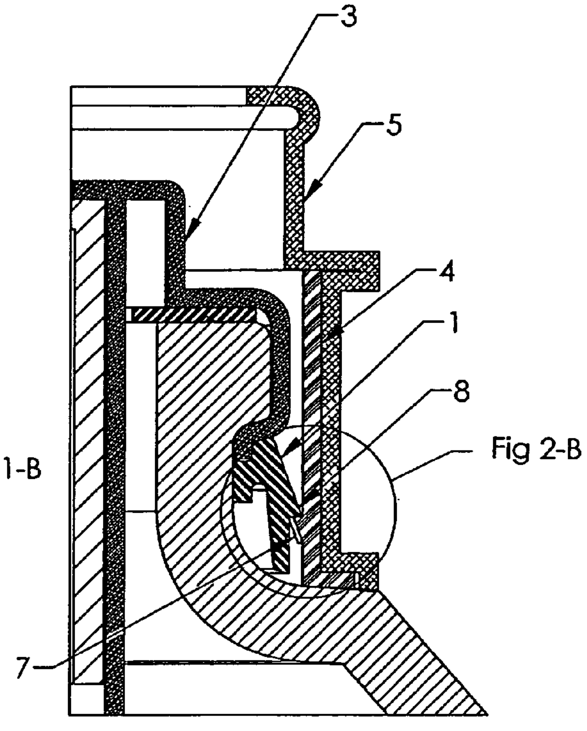
Fig 2-A

LEAK PROOF FRAGRANCE BOTTLE

FIELD OF THE INVENTION

The present invention is directed towards the elimination of undesired leakage of fragrance from bottles containing liquid.

BACKGROUND OF THE INVENTION

Fragrance bottles are filled with liquid fragrance on an automated filling line. After the bottles are filled, a pump is installed onto the neck of the bottle. A collar is installed over the pump. The collar must meet the separation criteria which is usually considered an industry standard. These collars use a friction fit to comply with this standard and this fit if improper can cause the pump to leak.

OBJECT OF THE INVENTION

The present invention is directed toward a device identified as a slip ring collar retainer for fragrance bottles which prevents leakage of fragrance.

SUMMARY OF THE INVENTION

In accordance with the principles of this invention, a leak proof fragrance bottle employs a vertical bottle having an open circular neck. A vertical pump extends downwardly through the neck into the interior of the bottle. The pump has a major portion with a diameter larger than the diameter of the neck that extends above the neck and engages the top of the neck.

A horizontal ring shaped member has an upper section having a first ring diameter and a lower section having a second ring diameter larger than the first ring diameter and larger than the major portion of the pump. The member has a vertical slot extending through both ring sections.

The second section of the member is disposed below the major portion and snaps into engagement with the major portion. The first section of the member is disposed around the major portion and snaps into engagement with the major portion.

Also employed is a vertical hollow removable insert cap structure closed at a top end with an open lower end, the lower end of the structure having a horizontal groove which snaps onto the second section of the member.

This arrangement eliminates the previously used friction fit and prevents leakage caused by it.

All of the foregoing objects and advantages with either be explained or will become apparent when the accompanying drawings are studied in conjunction with the detailed description which follows.

DETAILED DESCRIPTION OF PREFERRED EMBODIMENT

Figure 1:
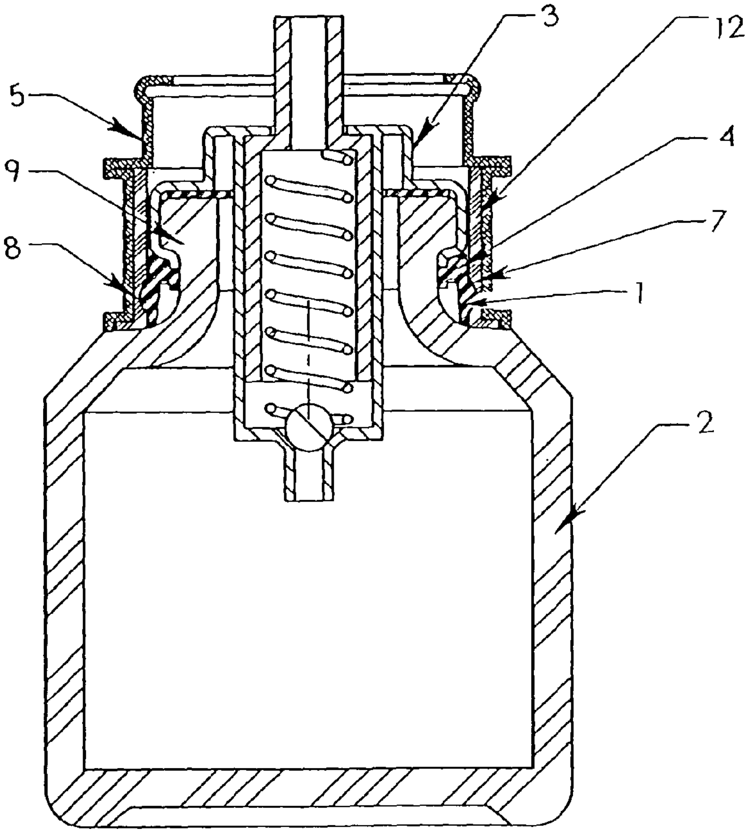
FIG. 1 is a vertical cross section of a preferred embodiment of the invention as assembled, FIG. 1-A is a detail view of the embodiment of FIG. 1, FIG. 1-B is a detail view of the embodiment of FIG. 1-A.
Figure 2:
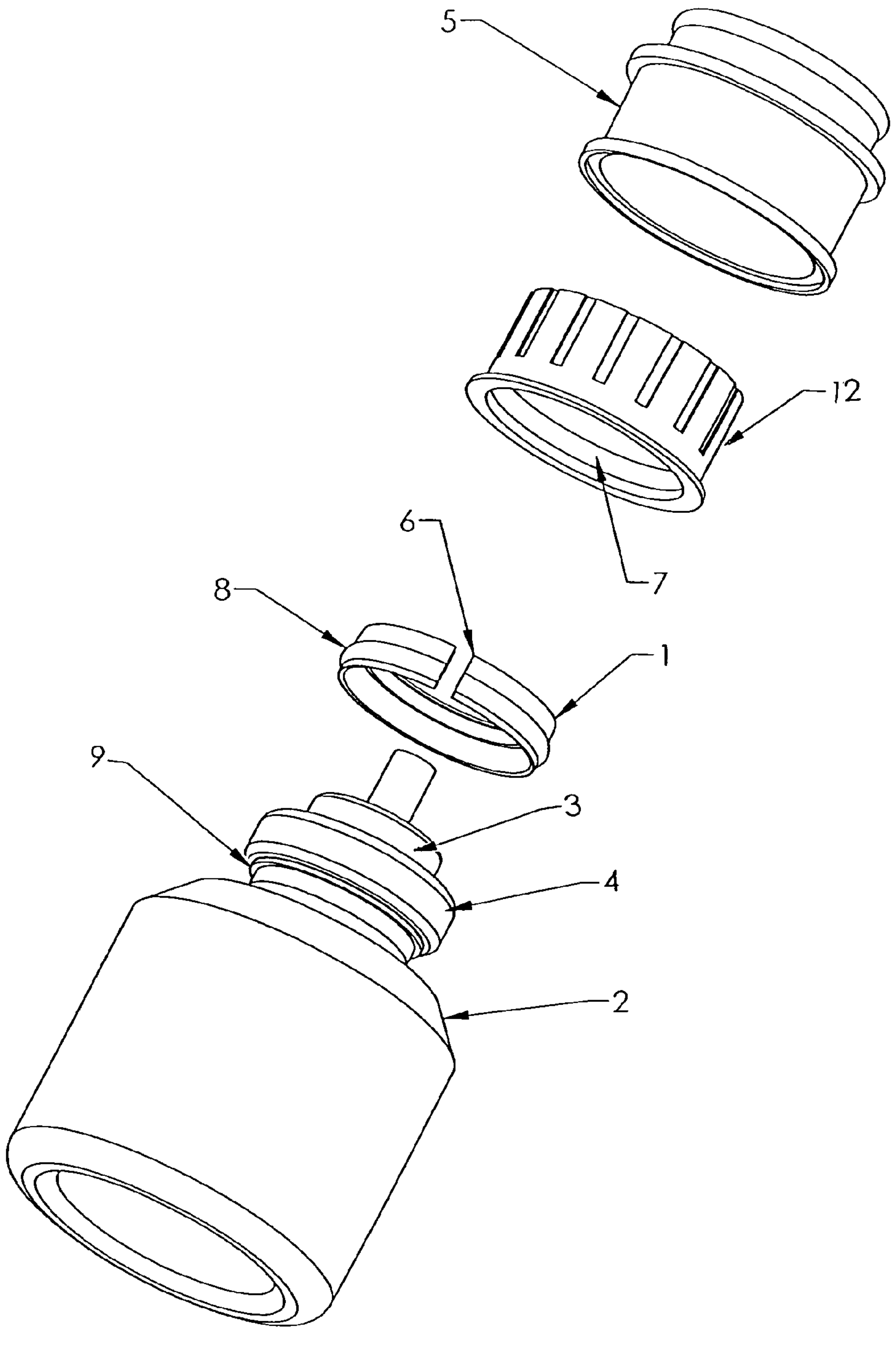
FIG. 2 is an exploded view of the structure shown in FIG. 1.
Figure 3:
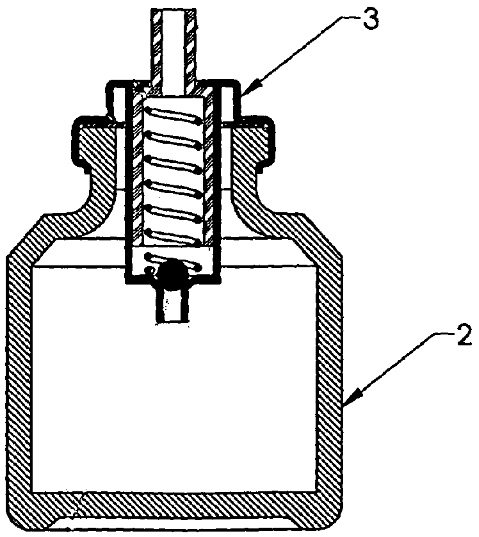
Fig 3 PRIOR ART
FIG. 3 is a sectional view of a prior art pump placed into a bottle.
Figure 4:
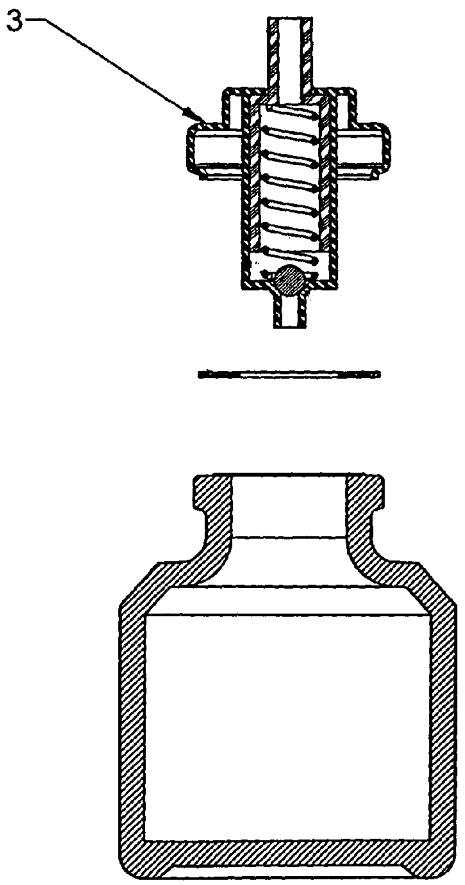
Fig 4 PRIOR ART
FIG. 4 is an exploded view of a prior art pump and a bottle.
Figure 5:
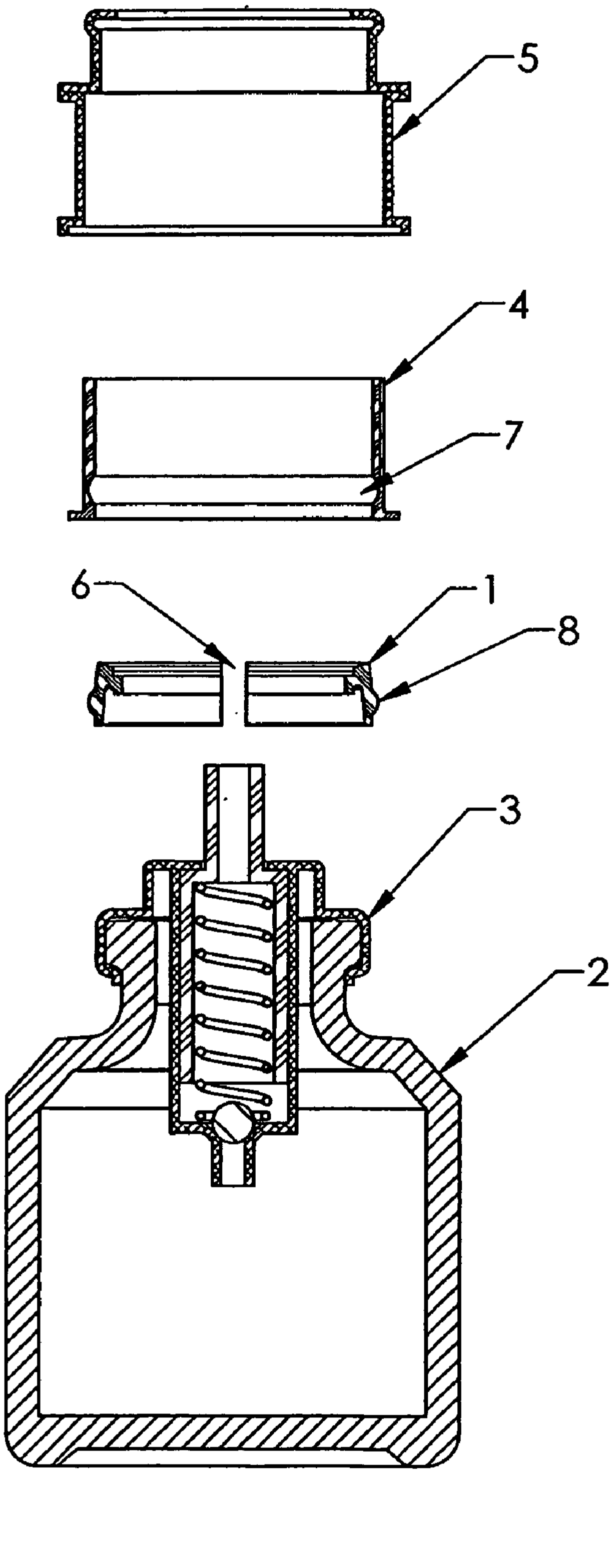
FIG. 5 is an exploded view of a prior art pump placed into a bottle shown in FIG. 3.

As shown in FIGS. 1 and 2, a fragrance containing bottle 2 contains an assembled pump 3 which extends into the interior of the bottle with a major portion 4 secured to and engaging the neck 9 of the bottle and extending above it.

A horizontal ring shaped member has an upper section 1 having a first ring diameter and a lower section 8 having a second ring diameter larger than the first ring diameter and larger than the major portion of the pump. The member has a vertical slot 6 extending through both ring sections. The member is constructed of a plastic which is a material which is fragrance resistant.

The second section 8 of the member is disposed below the major portion 4 and snaps into engagement with the major portion 4. The first section 1 of the member is disposed around the major portion 4 and snaps into engagement with the major portion 4.

A vertical hollow removable insert cap structure uses a plastic insert 12 which is mechanically inserted into an aluminum or plastic collar 5. Insert 12 has an internal horizontal groove 7 which extends past the major portion 4 and allows the insert and the collar to be assembled over the top of the pump 3 and snapped onto the sections 8 and 1 without disturbing the assembled pump.

The gap 6 is fully closed when the collar 5 and the insert 12 is snapped into position creating an equal diametrical force to hold collar and cap in position, creating an acceptable removable force.

While the preferred embodiment has been disclosed with detailed reference to the detailed description and the drawings, the protection solicited is to be limited only by the terms of the claims which follow.

What is claimed is:

1. A leak proof fragrance bottle comprising:

a vertical bottle having an open circular neck;

a vertical pump extending downwardly through the neck into the interior of the vertical bottle, the pump having a major portion in part with a diameter larger than the diameter of an upper end of the neck, extending above and around the neck and engaging the top of the neck;

a horizontal ring shaped member having an upper ring section having an upper ring diameter engaging a recessed lower end of the major portion of the vertical pump and a lower ring section having a lower ring diameter and the lower ring diameter being larger than the upper ring diameter and larger than the in part diameter of the major portion of the vertical pump, a cylinder stratum having essentially cylindrical shape and substantially surrounding the neck and the major portion of the vertical pump and having an internally disposed horizontal groove snapping into the lower ring section having the lower ring diameter, wherein said ring shaped member has a vertical slot extending through both ring sections, and wherein said lower ring section is snap engaged in the internal horizontal groove of the cylinder stratum and the upper ring section is snap engaged in a position around the recessed lower end of the major portion of the pump.

2. The leak proof fragrance bottle of claim 1 wherein the cylinder stratum (12) consists of a hollow cylinder open at two ends, said cylinder stratum (12) carrying said internal horizontal groove (7), and the vertical hollow collar (5) having open ends and slidably engaging the cylinder stratum (12) from the outside prior to the snapping in of the horizontal groove (7) of the cylinder stratum (12) onto the lower ring section (8) of the horizontal ring shaped member (1, 8).

3. The leak proof fragrance bottle of claim 2 wherein the open circular neck (9) has an enlarged peripheral top region and a lower recessed region and wherein the vertical pump (3) engages both the enlarged top region of the open circular neck (9) and the lower recessed region of the open circular neck (9).

4. The leak proof fragrance bottle of claim 3 wherein the horizontal ring shaped member (1, 8) is constructed of a plastic material which is fragrance resistant.

5. A leak proof fragrance dispenser comprising:

a vertical bottle (2) having an open circular neck (9);

a vertical pump (3) extending downwardly through the open circular neck (9) into the interior of the vertical bottle (2) and having a major portion, a horizontal ring shaped member (1, 8) having an upper ring section having an upper ring diameter and contacting the major portion (4) of the pump (3) and a lower ring section having a lower ring diameter and the lower ring diameter of the lower ring section being larger than the upper ring diameter of the upper ring section;

a cylinder stratum (12) surrounding the major portion (4) of the pump (3) and the ring shaped member (1,8);

an inner horizontal circumferential groove (7) disposed on an inner surface of the cylinder stratum (12) and engaging the lower ring section (8) of the ring shaped member (1,8); and a vertical hollow collar (5) open at a top end and with an open lower end and surrounding the cylinder stratum (12); and wherein the cylinder stratum (12) consists of a hollow cylinder open at two ends, said cylinder stratum (12) carrying said internal horizontal groove (7), and the vertical hollow collar (5) having open ends and slidably engaging the cylinder stratum (12) from the outside prior to the snapping in of the horizontal groove (7) of the cylinder stratum (12) onto the lower ring section (8) of the horizontal ring shaped member (1, 8).

6. The leak proof fragrance bottle of claim 5 wherein said ring shaped member has a vertical slot extending through both ring sections, and wherein said lower ring section is snap engaged in the internal horizontal groove of the cylinder stratum and the upper ring section is snap engaged in a position around the recessed lower end of the major portion of the pump.

7. The leak proof fragrance bottle of claim 6 wherein the slot is fully closed when the cylinder stratum is snapped into place.

8. The leak proof fragrance bottle of claim 7 wherein the bottle is filled with liquid fragrance.

9. The leak proof fragrance bottle of claim 7 wherein the cylinder stratum consists of a hollow cylinder open at both ends, said hollow cylinder stratum having said horizontal groove, and a vertical hollow collar slidably engaging the cylinder stratum before the cylinder stratum engages the lower ring outer diameter of the horizontal ring shaped member.

10. The leak proof fragrance bottle of claim 6 wherein the neck has an enlarged peripheral top region and a lower recessed region and wherein the pump engages both the top and lower regions of the neck.

11. The leak proof fragrance bottle of claim 6 wherein the horizontal ring shaped member is constructed of a plastic material.

12. The leak proof fragrance bottle of claim 5 wherein said ring shaped member (1, 8) has a vertical slot (6) extending through each of the ring sections (1, 8), and wherein the groove (7) of the cylinder stratum (12) snaps onto the lower ring section (8).

13. The leak proof fragrance bottle of claim 12 wherein the vertical slot (6) is fully closed when the cylinder stratum (12) is snapped into place.

14. The leak proof fragrance bottle of claim 5 wherein the bottle (2) is filled with liquid fragrance.

15. A leak proof fragrance dispenser comprising:

a vertical bottle (2) having an open upper circular neck (9) and having an upper rim;

a vertical pump (3) extending downwardly through the open upper circular neck (9) into the interior of the vertical bottle (2), the vertical pump (3) having an upper portion with an outer diameter larger than an outer diameter of the open upper circular neck (9), wherein an upper portion of the vertical pump (3) extends above the open upper circular neck (9) and engages a top of the open upper circular neck (9) and wherein a major portion (4) of the vertical pump (3) engages the upper rim of the open upper circular neck (9);

a horizontal ring shaped member (1, 8) having an upper ring section (1) disposed directly between the major portion (4) of the pump (3) and the lower outside end of the neck (9) and having a lower ring section (8);

a gap (6) furnished in the horizontal ring shaped member (1,8) such that the gap (6) is sealed when the horizontal ring shaped member (1,8) is positioned between the fragrance containing bottle (2), the major portion of the vertical pump (3) and a cylinder stratum (12) engaging the lower ring section (8);

the cylinder stratum (12) substantially surrounding the open upper circular neck (9) and the major portion (4) of the pump (3) and having an internal horizontal groove (7), which snaps directly onto the lower ring section (8) of the horizontal ring shaped member (1,8);

a vertical hollow collar (5) surrounding the cylinder stratum (12) and an upper end of the vertical pump (3).

16. The leak proof fragrance dispenser according to claim 15;

wherein the cylinder stratum (12) is secured to the bottle (2) through the horizontal ring shaped member (1, 8) after the placing of a collar (5) around the cylinder stratum (12).

17. The leak proof fragrance dispenser according to claim 15 wherein the horizontal ring shaped member is made of a plastic.

* * * * *